(12) United States Patent
Matsuo et al.

(10) Patent No.: US 8,675,300 B2
(45) Date of Patent: Mar. 18, 2014

(54) DEVICE AND METHOD OF READING AND WRITING DATA ON MAGNETIC RECORDING MEDIUM IN CASE OF OFF-TRACK OCCURING

(75) Inventors: Takashi Matsuo, Hasuda (JP); Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 13/455,964

(22) Filed: Apr. 25, 2012

(65) Prior Publication Data

US 2013/0194699 A1  Aug. 1, 2013

(30) Foreign Application Priority Data

Jan. 31, 2012  (JP) ................ 2012-018620

(51) Int. Cl.
*G11B 5/58* (2006.01)
(52) U.S. Cl.
USPC .................... 360/77.01; 360/77.08
(58) Field of Classification Search
USPC .............. 360/75, 77.01, 77.07, 77.08, 77.04
See application file for complete search history.

(56) References Cited

U.S. PATENT DOCUMENTS

| | | | | |
|---|---|---|---|---|
| 5,065,263 A * | 11/1991 | Yoshida et al. | ............ | 360/77.03 |
| 7,349,321 B2 | 3/2008 | Kudo et al. | | |
| 7,623,312 B2 * | 11/2009 | Ehrlich | ............ | 360/71 |
| 2001/0043525 A1 * | 11/2001 | Ito et al. | ............ | 369/47.14 |
| 2003/0048731 A1 * | 3/2003 | Ozaki | ............ | 369/59.25 |
| 2012/0300341 A1 * | 11/2012 | Matsuo et al. | ............ | 360/77.02 |

FOREIGN PATENT DOCUMENTS

| | | |
|---|---|---|
| JP | 09-198821 A | 7/1997 |
| JP | 2005-332453 A | 12/2005 |
| JP | 2006-331491 A | 12/2006 |

* cited by examiner

*Primary Examiner* — Tan X Dinh

(74) *Attorney, Agent, or Firm* — Knobbe Martens Olson & Bear, LLP

(57) ABSTRACT

According to one embodiment, there is provided an information recording device that records information on a magnetic disk using a magnetic head. The registering module registers position data of a temporary defective sector using a sector where an off-track has occurred as a temporary defective sector. The reading module reads data from a target track. The cancellation processing module performs inter-track interference component cancellation processing with respect to the data read by the reading module using data written to a track adjacent to the target track, in which when a sector adjacent to a processing target sector in a track width direction is a temporary defective sector registered in the registering module, inter-track interference component cancellation processing is performed using data written to a substitute sector corresponding to the registered temporary defective sector.

18 Claims, 18 Drawing Sheets

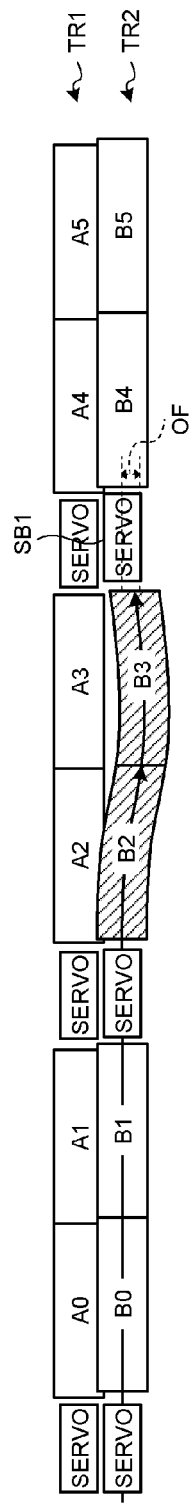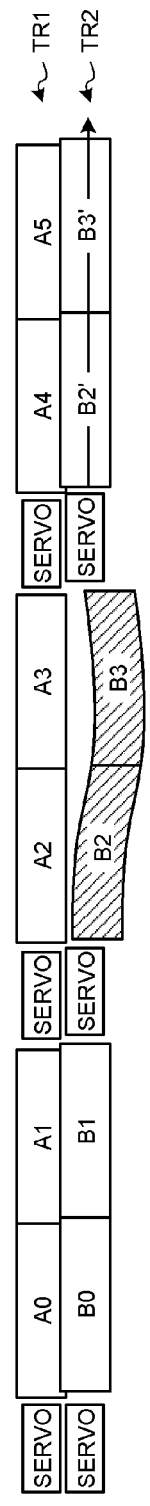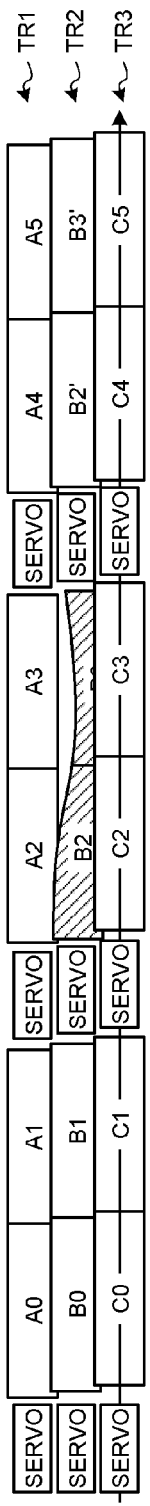

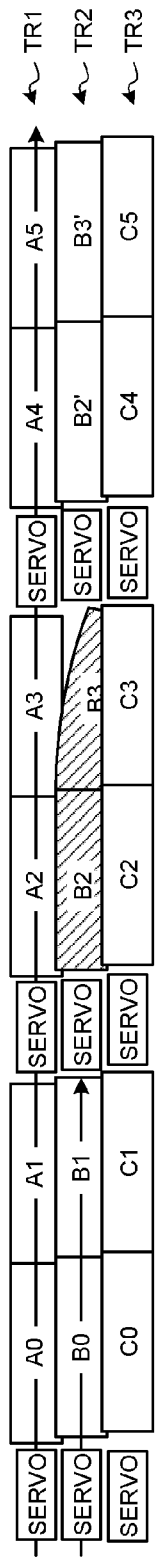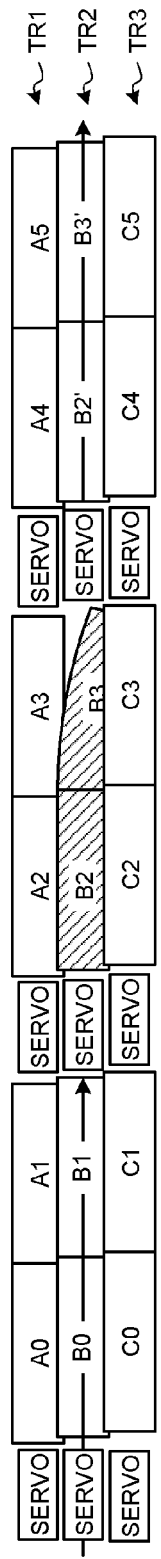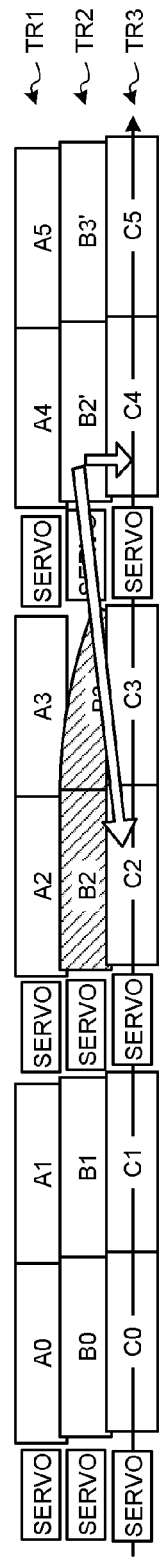

FIG.20
| 2621a | 2621b | 2621cj |
|---|---|---|
| ⟨POSITION DATA OF TEMPORARY DEFECTIVE SECTOR⟩ | ⟨POSITION DATA OF SUBSTITUTE SECTOR⟩ | ⟨AMOUNT OF DEVIATION⟩ |
| EP1 | AP1 | OF1 |
| EP2 | AP2 | OF2 |
| ⋮ | ⋮ | ⋮ |
2621j
FIG.21A
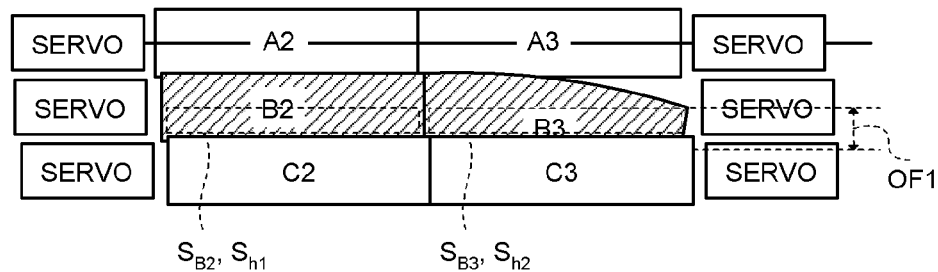
FIG.21B
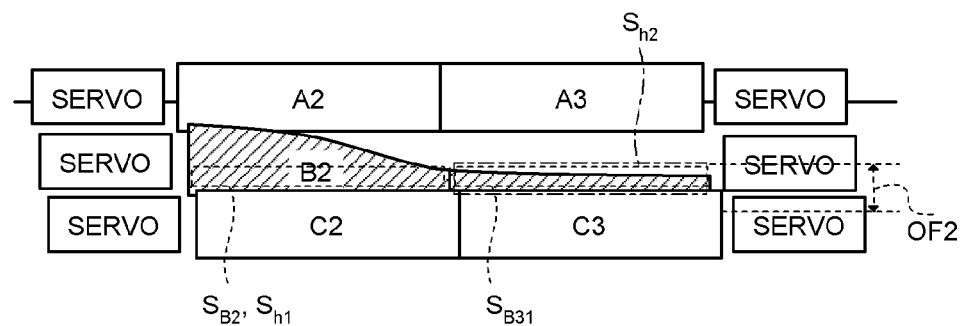

DEVICE AND METHOD OF READING AND WRITING DATA ON MAGNETIC RECORDING MEDIUM IN CASE OF OFF-TRACK OCCURING

CROSS-REFERENCE TO RELATED APPLICATIONS

This application is based upon and claims the benefit of priority from Japanese Patent Application No. 2012-018620, filed on Jan. 31, 2012; the entire contents of which are incorporated herein by reference.

FIELD

Embodiments described herein relate generally to an information recording device and an information recording method.

BACKGROUND

In recent years, an information recording device such as a hard disk device is increasing the density of data stored in a magnetic disk. Accordingly, the track pitch of the magnetic disk is narrowing. When data are written to a magnetic disk with a narrow track pitch using a magnetic head, if off-track occurs in the track width direction, there is a possibility that it is not possible to read the accurate data written to that sector.

BRIEF DESCRIPTION OF THE DRAWINGS

FIGS. 6A to 6D are diagrams illustrating an operation of the information recording device of the first embodiment;

FIGS. 7A to 7C are diagrams illustrating an operation of the information recording device of the first embodiment;

FIG. 20 is a diagram illustrating a data structure of a temporary defective sector table of the fourth embodiment; and FIGS. 21A and 21B are diagrams illustrating an operation of an estimating module of the fourth embodiment.

DETAILED DESCRIPTION

In general, according to one embodiment, there is provided an information recording device that records information on a magnetic disk using a magnetic head. The information recording device includes a writing module, a registering module, a reading module, and a cancellation processing module. The writing module writes data to a target track so that the target track partially overlaps a track adjacent to the target track of the magnetic disk, in which when off-track wherein the magnetic head deviates from the target track occurs, data to be written to a sector where the off-track has occurred are written to a substitute sector positioned after the sector where the off-track has occurred. The registering module registers position data of a temporary defective sector using the sector where the off-track has occurred as the temporary defective sector. The reading module reads data from the target track. The cancellation processing module performs inter-track interference component cancellation processing with respect to the data read by the reading module using data written to a track adjacent to the target track, in which when a sector adjacent to a processing target sector in a track width direction is a temporary defective sector registered in the registering module, inter-track interference component cancellation processing is performed using data written to a substitute sector corresponding to the registered temporary defective sector.

Exemplary embodiments of an information recording device and an information recording method will be explained below in detail with reference to the accompanying drawings. The present invention is not limited to the following embodiments.

First Embodiment

Figure 1:
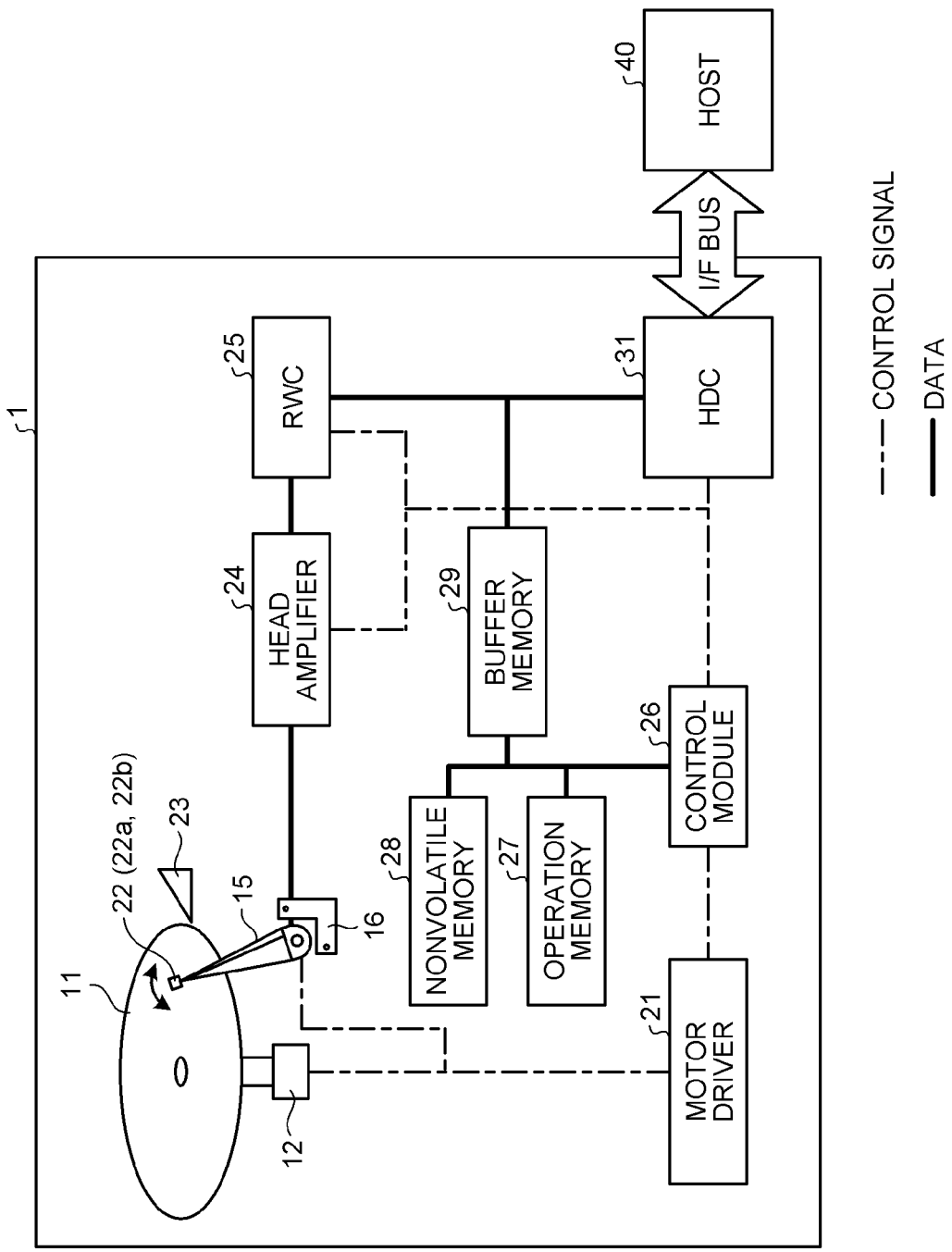
FIG. 1 is a diagram illustrating a configuration of an information recording device according to a first embodiment.

An information recording device 1 according to a first embodiment will be described with reference to FIG. 1. FIG. 1 is a diagram illustrating a configuration of the information recording device 1.

The information recording device 1 is a device that records information in a magnetic disk 11 using a magnetic head 22. For example, the information recording device 1 is a magnetic disk device (for example, a hard disk device). Specifically, the information recording device 1 includes the magnetic disk 11, a spindle motor 12, a motor driver 21, the magnetic head 22, an actuator arm 15, a voice coil motor (VCM) 16, a ramp 23, a head amplifier 24, a read/write channel (RWC) 25, a hard disk controller (HDC) 31, buffer memory 29, and a control module 26.

The magnetic disk 11 is rotated at a predetermined rotation speed about a rotation shaft by the spindle motor 12. Rotation of the spindle motor 12 is driven by the motor driver 21.

The magnetic head 22 performs writing and reading of data to and from the magnetic disk 11 using a recording head 22a and a reproducing head 22b provided thereto. Moreover, the magnetic head 22 is provided at a tip end of the actuator arm 15 and is moved along a radial direction (track width direction) of the magnetic disk 11 by the voice coil motor 16 driven by the motor driver 21. When rotation of the magnetic disk 11 is stopped, for example, the magnetic head 22 is retracted to be positioned on the ramp 23.

The head amplifier 24 amplifies and outputs a signal read from the magnetic disk 11 by the magnetic head 22 and supplies the amplified signal to the read/write channel 25. Moreover, the head amplifier 24 amplifies the signal for writing data to the magnetic disk 11, supplied from the read/write channel 25 and supplies the amplified signal to the magnetic head 22.

The hard disk controller 31 performs control of transmission and reception of data to and from a host computer 40 through an I/F bus, control of the buffer memory 29, error correction processing on recorded data, and the like. Moreover, the buffer memory 29 is used as a cache of data transmitted and received to and from the host computer 40. Furthermore, the buffer memory 29 is used for temporarily storing data read from the magnetic disk 11, data written to the magnetic disk 11, or control firmware read from the magnetic disk 11, for example.

The read/write channel 25 performs code modulation on data to be written to the magnetic disk 11, supplied from the hard disk controller 31 and supplies the modulated data to the head amplifier 24. Moreover, the read/write channel 25 performs code demodulation on a signal read from the magnetic disk 11 and supplied from the head amplifier 24 and outputs the demodulated signal to the hard disk controller 31 as digital data.

The control module 26 is connected to operation memory 27 (for example, static random access memory (SRAM)), nonvolatile memory 28 (for example, flash read only memory (Flash ROM)), and buffer memory 29 for temporary storage (for example, dynamic random access memory (DRAM)). The control module 26 performs control of the entire hard disk device 1 in accordance with a firmware stored in advance in the nonvolatile memory 28 and the magnetic disk 11. The firmware is an initial firmware and a control firmware used for a normal operation. The initial firmware executed initially at the startup is stored in the nonvolatile memory 28. The control firmware includes an information recording program described later. Moreover, the control firmware used for a normal operation is recorded in the magnetic disk 11. Once the control firmware is read from the magnetic disk 11 into the buffer memory 29 in accordance with the control of the initial firmware, the control firmware is stored in the operation memory 27.

In the information recording device 1, writing of data is performed with respect to a plurality of tracks formed concentrically on the magnetic disk 11 by the recording head 22a in the order from the inner track to the outer track or the order from the outer track to the inner track, for example. In this case, the buffer memory 29 temporarily stores the data of tracks in which data have been written. For example, when writing data in the order from the inner track to the outer track, the buffer memory 29 temporarily stores the track data at least until writing of data to the sector of an outside track adjacent to the track ends.

In this case, a shingled write recording method is employed as a method of further increasing the data recording capacity of the magnetic disk 11. In the shingled write recording method, since the track width of the magnetic disk 11 is narrower than the width of a main magnetic pole of the recording head 22a, when writing data using the recording head 22a, partial overwriting is performed between a writing target track and a track adjacent to the target track. According to this shingled write recording method, since the track width can be narrowed, it is possible to realize high-density recording of the magnetic disk 11.

Figure 3:
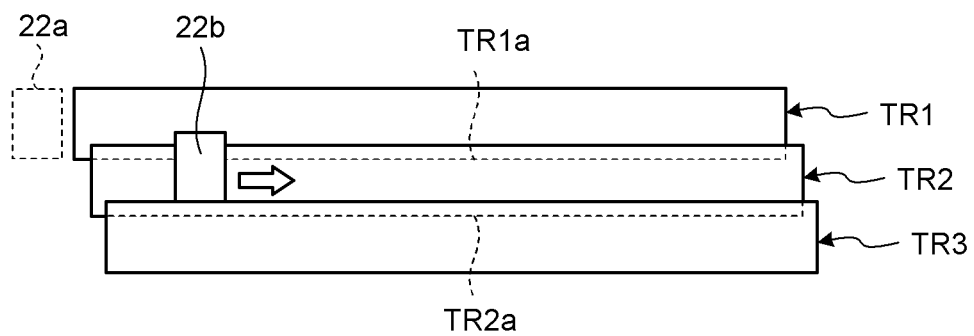
FIG. 3 is a diagram illustrating an operation of the information recording device of the first embodiment.

In the shingled write recording method, partial overwriting is performed between adjacent tracks. For example, as shown in FIG. 3, after data are written to a track TR1, when writing data to a target track TR2, the data of the target track TR2 are overwritten to a part TR1a on the target track TR2 side of the adjacent track TR1. Similarly, after data are written to the track TR2, when writing data to a target track TR3, the data of the target track TR3 are overwritten to a part TR2a on the target track TR3 side of the adjacent track TR2. That is, the shingled write recording method is a method in which data are written in a shingled form by narrowing a track pitch using a plurality of tracks (track group) as a block of writing modules. According to the shingled write recording method, since overlapping of adjacent tracks is partial, and the number of writing of adjacent tracks can be suppressed to one, it is possible to decrease the influence of magnetic interference on adjacent tracks.

On the other hand, in the information recording device 1, since the track width of the magnetic disk 11 is narrower than the width of a main magnetic pole of the reproducing head 22b, when reading data using the reproducing head 22b, the data of the target track are read while receiving interference from the data of the adjacent tracks. For example, as shown in FIG. 3, when reading data from the target track TR2, the data receives interference from the data of the adjacent track TR1. Similarly, when reading data from the target track TR3, the data receives interference from the data of the adjacent track TR2. Thus, the information recording device 1 employs an inter-track interference (ITI) cancellation method in which disk reading is performed while cancelling inter-track interference components using the sector data of adjacent tracks when reading data from the magnetic disk 11, recorded by the shingled write recording method. In the ITI cancellation method, data written to sectors adjacent to a read target sector in the track width direction are read in advance from the buffer memory 29, for example, and inter-track interference components are cancelled by the data, for example. In this way, it is possible to maintain reproduction performance comparable to a case where the track pitch is not narrowed.

Figure 4:
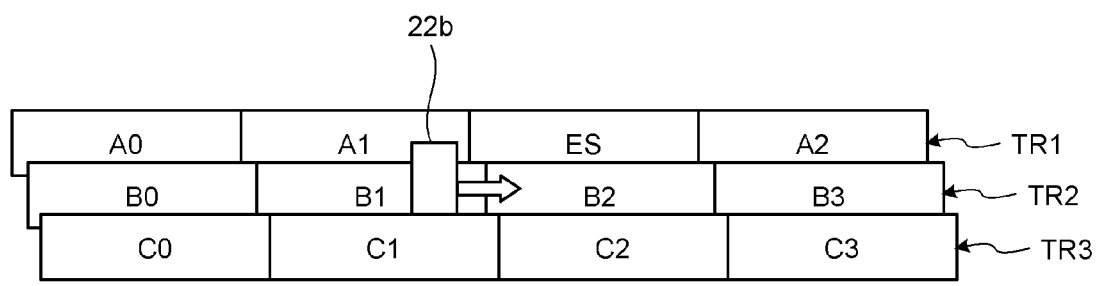
FIG. 4 is a diagram illustrating an operation of the information recording device of the first embodiment.

In the ITI cancellation method, when a sector adjacent to a reading target sector in the track width direction is a defective sector, the data of the defective sector are regarded as a writing fault and are not temporarily stored in the buffer memory 29, it is difficult to cancel inter-track interference components. For example, as shown in FIG. 4, when data are read from the target track TR2, and a sector adjacent to a processing target sector B2 in the track width direction is a defective sector ES, since the data written to the defective sector ES is unclear, it is difficult to perform inter-track interference component cancellation processing on the data read from the sector B2.

Therefore, a method may be considered in which the data of a fixed pattern such as a predetermined repetitive pattern are recorded in a defective sector when writing data, and inter-track interference component cancellation processing is performed by regarding the data of the fixed pattern as inter-track interference components.

Figure 5A:
FIGS. 5A to 5D are diagrams illustrating an operation of the information recording device of the first embodiment.
Figure 5B:
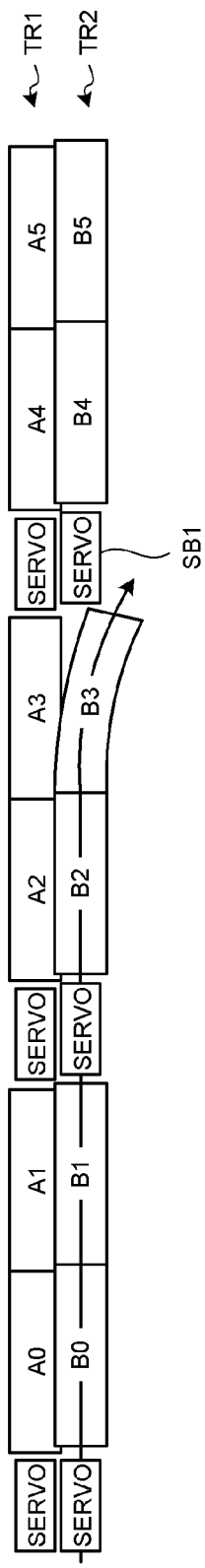
Figure 5C:
Figure 5D:
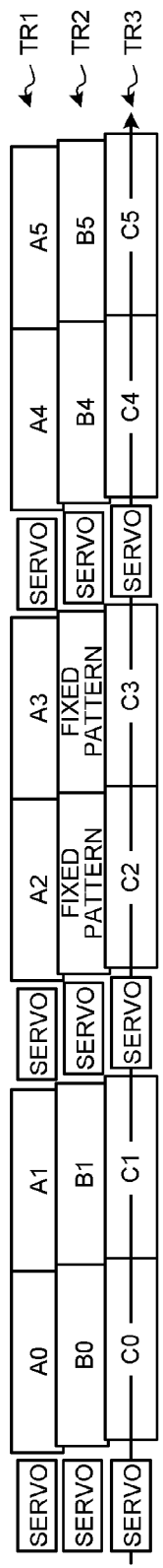

However, in this case, two or more writing operations must be performed on a defective sector. For example, a case will be considered in which after data are sequentially written to sectors A0 to A5 of the track TR1 as shown in FIG. 5A, data are sequentially written to sectors B0 to B3 of the track TR2 as shown in FIG. 5B, and the occurrence of off-track in the sectors B2 and B3 is detected based on the information of a servo SB1 subsequent to the sector B3. The off-track is a phenomenon in which the recording head 22a of the magnetic head 22 deviates from a target track. In this case, since off-track has occurred when writing data to the sectors B2 and B3, fixed pattern data are written to the sectors B2 and B3 as shown in FIG. 5C by regarding the writing of data to the sectors B2 and B3 as a writing fault and the sectors B2 and B3 as defective sectors. After that, after data are written to the subsequent sectors B4 and B5 of the track TR2, data are sequentially written to sectors C0 to C5 of the track TR3 as shown in FIG. 5D. In this case, writing of initial data and writing of fixed pattern data are performed on the defective sector B2 and B3. As above, when two or more writing operations are performed on a defective sector, a track (for example, the sectors A2 and A3 shown in FIG. 5C) adjacent to the defective sector in the track width direction tends to deteriorate by receiving magnetic interference. Thus, there is a possibility that the influence of magnetic interference on adjacent tracks increases.

That is, in the shingled write recording method, it is desirable to suppress the number of writing to the same physical sector to one in order to suppress the influence of magnetic interference on adjacent tracks. In other words, it is desirable to perform inter-track interference component cancellation processing reliably while suppressing the number of writing to the same physical sector to one.

Therefore, the present embodiment proposes a method in which under the control of the control module 26, when a writing fault occurs, sectors where a writing fault has occurred are registered in a temporary defective sector table as temporary defective sectors, and writing is continuously performed using the subsequent physical sectors as substitute sectors. In this method, when a sector adjacent to a reading target sector in the track width direction is a defective sector, inter-track interference component cancellation processing is performed using the data of the substitute sectors.

Figure 2:
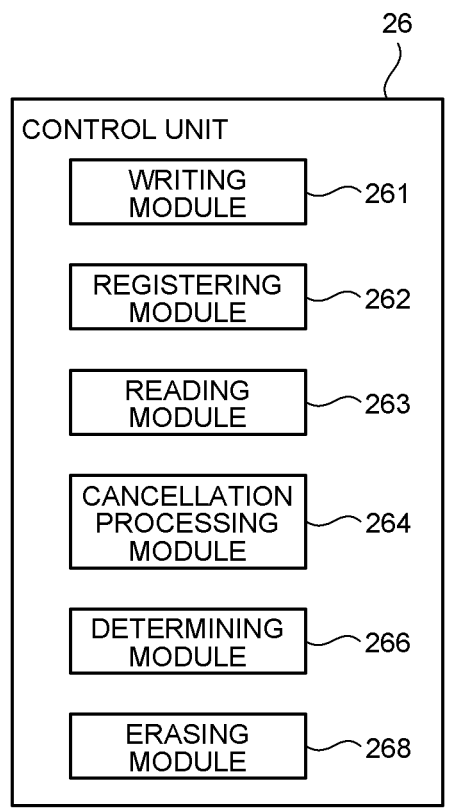
FIG. 2 is a diagram illustrating a configuration of a control module of the first embodiment.

Specifically, as shown in FIG. 2, the control module 26 includes a writing module 261, a determining module 266, a registering module 262, an erasing module 268, a reading module 263, and a cancellation processing module 264.

The writing module 261 writes data to a target track in accordance with the shingled write recording method. That is, the writing module 261 writes data to a target track using the recording head 22a so that the target track partially overlaps with a track adjacent to the target track of the magnetic disk 11. For example, the writing module 261 writes data to the target track TR2 so that the target track TR2 partially overlaps with the track TR1 adjacent to the target track TR2 as shown in FIG. 3.

Specifically, the writing module 261 sequentially writes data to a plurality of sectors of a target track. In this case, the writing module 261 temporarily stores data to be written to respective sectors in the buffer memory 29 as backup data. When a notification of the occurrence of off-track during writing of data is received from the determining module 266, the writing module 261 reads data to be written to a sector where the off-track has occurred from the buffer memory 29. Then, the writing module 261 writes the read data to a substitute sector subsequent to the sector on the target track where the off-track has occurred. That is, when off-track occurs during writing, the writing module 261 writes data to be written to a sector where the off-track has occurred to a substitute sector without reaccessing the sector where the off-track has occurred.

For example, a case will be considered in which after data are sequentially written to sectors A0 to A5 of the track TR1 as shown in FIG. 6A, data are sequentially written to sectors B0 to B3 of the track TR2 as shown in FIG. 6B, and the occurrence of off-track in the sectors B2 and B3 is detected based on the information of a servo SB1 subsequent to the sector B3. The off-track is a phenomenon in which the recording head 22a of the magnetic head 22 deviates from a target track. In this case, since off-track has occurred when writing data to the sectors B2 and B3, the writing of data to the sectors B2 and B3 is regarded as a writing fault and the sectors B2 and B3 are regarded as temporary defective sectors. Moreover, as shown in FIG. 6C, the data to be written to the sectors B2 and B3 are read from the buffer memory 29 using the sectors B4 and B5 subsequent to the sectors B2 and B3 as substitute sectors B2' and B3', and the read data are written to the substitute sectors B2' and B3'. After that, as shown in FIG. 6D, data are sequentially written to sectors C0 to C5 of the track TR3. In this case, since only writing of initial data is performed on the temporary defective sectors B2 and B3, the number of writing to the temporary defective sectors B2 and B3 can be suppressed to one.

The determining module 266 reads servo information using the reproducing head 22b when the writing module 261 writes data. The determining module 266 calculates an amount of deviation (for example, the amount of deviation OF shown in FIG. 6B) from the target track of the recording head 22a of the magnetic head 22 based on the read servo information. Moreover, a first threshold value TH1 serving as the reference of determining whether off-track has occurred or not is set in advance in the determining module 266. The determining module 266 compares the calculated amount of deviation with the first threshold value TH1 and determines whether off-track has occurred or not based on the comparison results. For example, the determining module 266 determines that off-track has not occurred when the amount of deviation is smaller than the first threshold value TH1 and determines that off-track has occurred when the amount of deviation is equal to or larger than the first threshold value TH1. The determining module 266 sends the determination results to the writing module 261 and the registering module 262.

When the notification of the occurrence of off-track is received from the determining module 266, the registering module 262 registers the position data of temporary defective sectors using sectors where the off-track has occurred as the temporary defective sectors. For example, when a writing fault occurs due to off-track, the registering module 262 registers the position data of temporary defective sectors in a temporary defective sector table 2621 which is managed separately from a normal defective sector table. For example, the registering module 262 additionally registers the position data of temporary defective sectors in the temporary defective sector table 2621 by additionally writing the same in the temporary defective sector table 2621 written to a file system area of the magnetic disk 11 using the recording head 22a.

Figure 10:
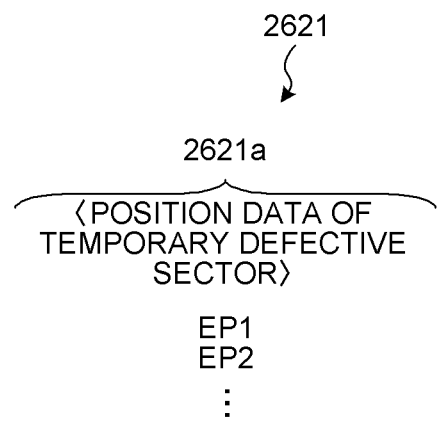
FIG. 10 is a diagram illustrating a data structure of a temporary defective sector table of the first embodiment.

The temporary defective sector table 2621 includes a temporary defective sector position data field 2621a as shown in FIG. 10, for example. The position data EP1, EP2, and so on of a plurality of temporary defective sectors are registered in the temporary defective sector position data field 2621a.

The reading module 263 reads data from a target track using the reproducing head 22b. Specifically, the reading module 263 sequentially reads data from a plurality of sectors of the target track. In this case, the reading module 263 temporarily stores the read data in the buffer memory 29 as backup data. Moreover, the reading module 263 skips temporary defective sectors without reading data from the temporary defective sectors by referring to the temporary defective sector table 2621.

For example, after sequentially reading data from the sectors A0 to A5 of the track TR1 as shown in FIG. 7A, the reading module 263 sequentially reads data from the sectors B0 and B1 of the track TR2 as shown in FIG. 7B and reads data from the substitute sectors B2' and B3' subsequent to the sectors B2 and B3 by skipping the sectors B2 and B3 regarded as temporary defective sectors. After that, the reading module 263 sequentially reads data from the sectors C0 to C5 of the track TR3 as shown in FIG. 7C.

The reading module 263 supplies the read data to the cancellation processing module 264.

The cancellation processing module 264 receives the read data from the reading module 263. The cancellation processing module 264 performs inter-track interference component cancellation processing with respect to the read data using the data written to a track adjacent to the target track.

Specifically, the cancellation processing module 264 sequentially performs inter-track interference component cancellation processing with respect to the data of a plurality of sectors, sequentially read from the target track in accordance with the ITI cancellation method. In this case, the cancellation processing module 264 determines whether an adjacent sector adjacent to a processing target sector in the track width direction is a temporary defective sector registered by the registering module 262 by referring to the temporary defective sector table 2621. The cancellation processing module 264 performs inter-track interference component cancellation processing with respect to the data of a processing target sector using the data of an adjacent sector adjacent to the processing target sector in the track width direction unless the adjacent sector is not the temporary defective sector. The cancellation processing module 264 performs inter-track interference component cancellation processing with respect to the data of a processing target sector using the data of a substitute sector if the adjacent sector adjacent to the processing target sector in the track width direction is a temporary defective sector. The substitute sector is positioned to be subsequent to a temporary defective sector on the identical track as the temporary defective sector.

For example, after data are sequentially read from the sectors A0 to A5 of the track TR1 as illustrated in FIG. 7A, the cancellation processing module 264 refers to the temporary defective sector table 2621 (see FIG. 10) when data are read from the sector B0 of the track TR2 as illustrated in FIG. 7B. The cancellation processing module 264 determines that the adjacent sector A0 adjacent to the processing target sector B0 in the track width direction is not a temporary defective sector based on the reference results. The cancellation processing module 264 reads the data of the adjacent sector A0 from the buffer memory 29 and performs inter-track interference component cancellation processing with respect to the data of the processing target sector B0 using the data of the adjacent sector A0. The cancellation processing module 264 performs inter-track interference component cancellation processing in a similar manner with respect to the sectors B1, B2' and B3' of the tracks TR2.

After that, after data are sequentially read from the sectors C0 and C1 of the track TR3 as illustrated in FIG. 7C, the cancellation processing module 264 refers to the temporary defective sector table 2621 (see FIG. 10) when data are read from the sector C2. The cancellation processing module 264 determines that the adjacent sector B2 adjacent to the processing target sector C2 in the track width direction is a temporary defective sector based on the reference results. Moreover, the cancellation processing module 264 reads the data of the substitute sector B2' for the temporary defective sector B2 from the buffer memory 29 and performs inter-track interference component cancellation processing with respect to the data of the processing target sector C2 using the data of the substitute sector B2'. In addition, the cancellation processing module 264 may hold the data of the sector B2'.

When data are read from the sector C3, the cancellation processing module 264 refers to the temporary defective sector table 2621 (see FIG. 10). The cancellation processing module 264 determines that the adjacent sector B3 adjacent to the processing target sector C3 in the track width direction is a temporary defective sector based on the reference results. Moreover, the cancellation processing module 264 reads the data of the substitute sector B3' from the buffer memory 29 for the temporary defective sector B3 and performs inter-track interference component cancellation processing with respect to the data of the processing target sector C3 using the data of the substitute sector B3'. In addition, the cancellation processing module 264 may hold the data of the sector B3'.

After that, when data are read from the sector C4, the cancellation processing module 264 refers to the temporary defective sector table 2621 (see FIG. 10). The cancellation processing module 264 determines that the adjacent sector B2' adjacent to the processing target sector C4 in the track width direction is not a temporary defective sector based on the reference results. Moreover, the cancellation processing module 264 uses the data of the sector B2' if the data are held therein or reads the data of the adjacent sector B2' from the buffer memory 29 if the data are not held therein. The cancellation processing module 264 performs inter-track interference component cancellation processing with respect to the data of the processing target sector C4 using the data of the adjacent sector B2'.

Moreover, when data are read from the sector C5, the cancellation processing module 264 refers to the temporary defective sector table 2621 (see FIG. 10). The cancellation processing module 264 determines that the adjacent sector B3' adjacent to the processing target sector C5 in the track width direction is not a temporary defective sector based on the reference results. Moreover, the cancellation processing module 264 uses the data of the sector B3' if the data are held therein or reads the data of the adjacent sector B3' from the buffer memory 29 if the data are not held therein. The cancellation processing module 264 performs inter-track interference component cancellation processing with respect to the data of the processing target sector C5 using the data of the adjacent sector B3'.

The erasing module 268 erases unnecessary data among the data temporarily stored in the buffer memory 29 by the writing module 261. For example, when data are written in the order from the inner track to the outer track of the magnetic disk 11, the erasing module 268 erases the data of an inner sector adjacent to a sector of a target track where data writing has been finished among the data temporarily stored in the buffer memory 29. Alternatively, when data are written in the order from the inner track to the outer track of the magnetic disk 11, the erasing module 268 erases the data of all of the sectors of an inner track adjacent to a target track at once after writing of data to all of the sectors of the target track has been finished, among the data temporarily stored in the buffer memory 29.

Moreover, the erasing module 268 erases unnecessary data among the data temporarily stored in the buffer memory 29 by the reading module 263. For example, when data reading is performed in the order from the inner track to the outer track of the magnetic disk 11, the erasing module 268 erases the data read from all of the sectors of an inner track adjacent to a target track at once after reading of data from all of the sectors of the target track has been finished, among the data temporarily stored in the buffer memory 29.

Figure 8:
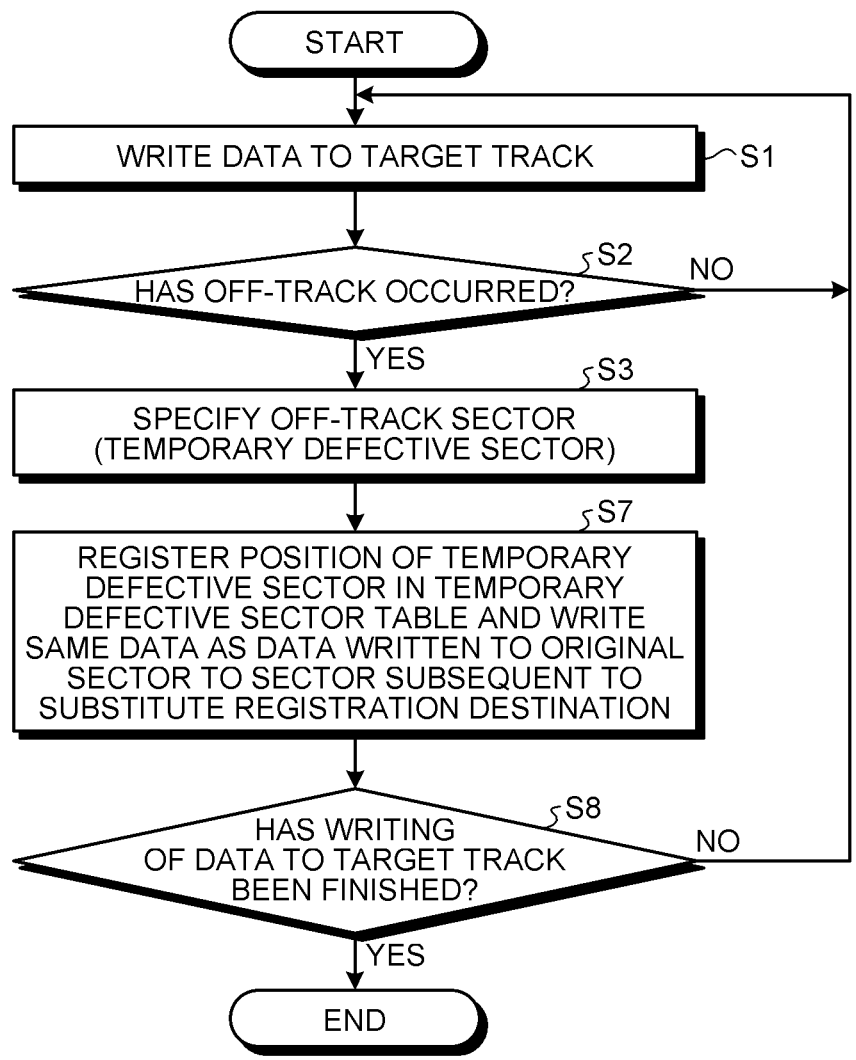
FIG. 8 is a flowchart illustrating an operation of the information recording device of the first embodiment.

Next, a writing operation of the information recording device 1 will be described with reference to FIG. 8. FIG. 8 is a flowchart illustrating a reading operation of the information recording device 1.

The information recording device 1 sequentially selects a writing target track from a plurality of tracks formed concentrically on the magnetic disk 11 and sequentially performs the following processes of steps S1 to S8 with respect to each of the selected target tracks.

In step S1, the writing module 261 performs a writing process on a target track. For example, the writing module 261 writes data to a sector subsequent to a sector of the target track, in which data have been previously written. In this case, the writing module 261 temporarily stores the data to be written to respective sectors in the buffer memory 29 as backup data.

In step S2, the determining module 266 determines whether off-track has occurred or not when data are written by the writing module 261.

Specifically, the determining module 266 reads servo information using the reproducing head 22*b*. The determining module 266 calculates an amount of deviation (for example, the amount of deviation OF illustrated in FIG. 6B) from a target track of the recording head 22*a* of the magnetic head 22 based on the read servo information. The determining module 266 compares the calculated amount of deviation with a first threshold value TH1 and determines whether off-track has occurred or not based on the comparison results. For example, the determining module 266 determines that off-track has not occurred when the amount of deviation is smaller than the first threshold value TH1 and determines that off-track has occurred when the amount of deviation is not smaller than the first threshold value TH1.

The process proceeds to step S3 when the determining module 266 determines that off-track has occurred (Yes in step S2), and the process returns to step S1 when the determining module 266 determines that off-track has not occurred (No in step S2).

In step S3, the writing module 261 specifies a sector where the off-track has occurred. For example, when it is determined that off-track has occurred based on the information of the servo SB1 illustrated in FIG. 6B, the writing module 261 specifies the sectors B2 and B3 previous to the servo SB1 as a sector where the off-track has occurred, that is a temporary defective sector.

In step S7, the registering module 262 registers the position data of a temporary defective sector using the sector where the off-track has occurred as the temporary defective sector. For example, the registering module 262 additionally registers the position data of temporary defective sectors in the temporary defective sector table 2621 by additionally writing in the temporary defective sector table 2621 written to a file system area of the magnetic disk 11 through the recording head 22*a*.

Moreover, the writing module 261 reads the data to be written to the sector where the off-track has occurred from the buffer memory 29. Moreover, the writing module 261 writes the read data to a substitute sector subsequent to the sector on the target track where the off-track has occurred.

In step S8, the writing module 261 determines whether the writing process on all of the sectors of the target track has been finished or not. The writing module 261 ends the process when the writing process has been finished (Yes in step S8) and returns the process to step S1 when the writing process has not been finished (No in step S8).

Figure 9:
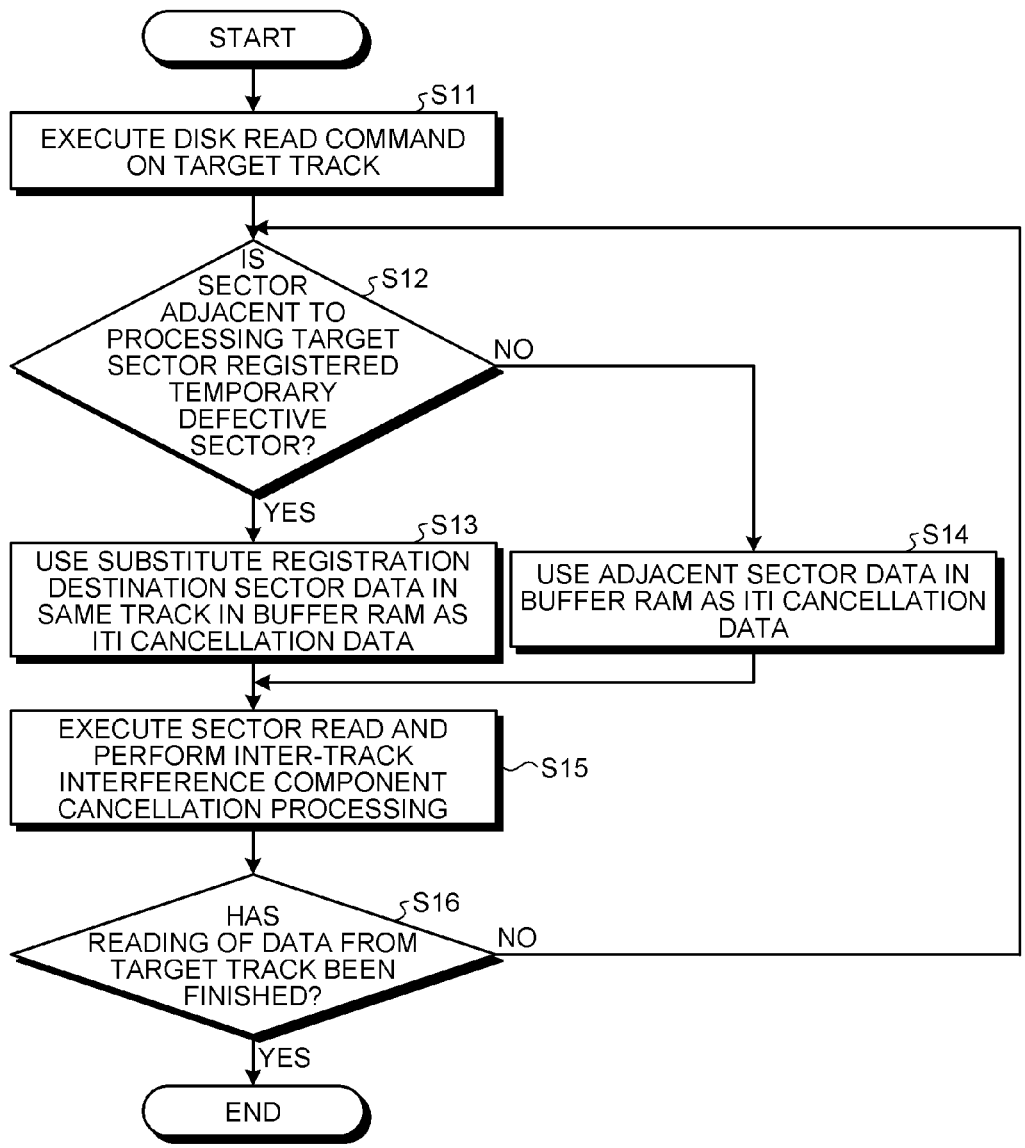
FIG. 9 is a flowchart illustrating an operation of the information recording device of the first embodiment.

Next, a reading operation of the information recording device 1 will be described with reference to FIG. 9. FIG. 9 is a flowchart illustrating a reading operation of the information recording device 1.

The information recording device 1 sequentially selects a reading process target track from a plurality of tracks formed concentrically on the magnetic disk 11 and sequentially performs the following processes of steps S11 to S16 on each of the selected target tracks.

In step S11, the reading module 263 executes a disk read command on the target track to create a state where a process of reading data from the target track can be started.

In step S12, the cancellation processing module 264 determines whether an adjacent sector adjacent to the processing target sector in the track width direction is a temporary defective sector registered by the registering module 262 or not.

Specifically, the cancellation processing module 264 refers to sector layout information stored in the file system area of the magnetic disk 11, for example, and specifies the position of an adjacent sector adjacent to the processing target sector in the track width direction. Moreover, the cancellation processing module 264 refers to the temporary defective sector table 2621 and determines whether the adjacent sector is a temporary defective sector or not.

The cancellation processing module 264 proceeds the process to step S13 when the adjacent sector is a temporary defective sector (Yes in step S12) and proceeds the process to step S14 when the adjacent sector is not a temporary defective sector (No in step S12).

In step S13, the cancellation processing module 264 performs preparations so that the data of a substitute sector for the adjacent sector (temporary defective sector) are used for inter-track interference component cancellation processing.

Specifically, the cancellation processing module 264 reads the data of the substitute sector for the adjacent sector (temporary defective sector) from the buffer memory 29. The cancellation processing module 264 sets the read data as the data to be used for the inter-track interference component cancellation processing.

In step S14, the cancellation processing module 264 performs preparations so that the data of the adjacent sector are used for inter-track interference component cancellation processing.

Specifically, the cancellation processing module 264 reads the data of the adjacent sector from the buffer memory 29. The cancellation processing module 264 sets the read data as the data to be used for the inter-track interference component cancellation processing.

In step S15, the reading module 263 executes a sector read operation. That is, the reading module 263 reads data from a processing target sector. In this case, the reading module 263 temporarily stores the read data in the buffer memory 29 as backup data. Moreover, the reading module 263 supplies the read data of the processing target sector to the cancellation processing module 264.

The cancellation processing module 264 performs inter-track interference component cancellation processing with respect to the read data of the processing target sector using the data set in step S13 or S14 in accordance with the ITI cancellation method.

In step S16, the reading module 263 determines whether the process of reading data from all of the sectors of the target track has been finished or not. When the reading process has been finished (Yes in step S16), the reading module 263 ends the process. When the reading process has not been finished (No in step S16), the reading module 263 returns the process to step S12 by using a new sector subsequent to a sector of the target track in which data have been previously read as the processing target sector.

As above, in the first embodiment, when off-track has occurred during writing, the writing module 261 writes the data to be written to a sector (temporary defective sector) where the off-track has occurred to a substitute sector positioned after the temporary defective sector on the target track. When a sector adjacent to the processing target sector in the track width direction is a temporary defective sector during performs inter-track interference component cancellation processing registered by the registering module 262, the cancellation processing module 264 performs inter-track interference component cancellation processing using the data written to a substitute sector corresponding to the registered temporary defective sector. In this way, when the sector adjacent to the processing target sector in the track width direction is a temporary defective sector, the inter-track interference component cancellation processing can be performed reliably. In this way, the number of writing to the temporary defective sector can be suppressed at once, and the inter-track interference component cancellation processing can be performed reliably.

That is, since the number of writing to the temporary defective sector can be suppressed at once, in the writing process, it is possible to decrease magnetic interference with a track adjacent to the defective sector in the track width direction, to decrease deterioration of the adjacent track, and to read the accurate data written to the sectors of the adjacent track. In other words, it is possible to improve the probability to succeed in reading data written to the sectors of the adjacent track.

Moreover, since inter-track interference component cancellation processing can be performed reliably, in the reading process, it is possible to cancel inter-track interference components with respect to the data read from the target track and to read the accurate data written to the sectors of the target track. In other words, it is possible to improve the probability to succeed in reading data written to the sectors of the adjacent track.

Moreover, in the first embodiment, when off-track has occurred during writing, the writing module 261 writes data to be written to a sector where the off-track has occurred to a substitute sector without reaccessing the sector (temporary defective sector) where the off-track has occurred. In this way, the number of writing to the temporary defective sector can be suppressed at once.

Moreover, in the first embodiment, when off-track has occurred during writing, the writing module 261 writes data to be written to a sector where the off-track has occurred using a sector on the target track where the off-track has occurred as a substitute sector. The cancellation processing module 264 specifies a sector subsequent to the temporary defective sector on an adjacent track as a substitute sector corresponding to the temporary defective sector. In this way, it is possible to easily specify a substitute sector corresponding to the temporary defective sector.

Moreover, in the first embodiment, the determining module 266 compares the amount of deviation from a target track of the recording head 22a of the magnetic head 22 with the first threshold value TH1 and determines where the off-track has occurred or not based on the comparison results. That is, the determining module 266 determines that off-track has not occurred when the amount of deviation is smaller than the first threshold value TH1 and determines that off-track has occurred when the amount of deviation is not smaller than the first threshold value TH1. In this way, it is possible to determine whether off-track has occurred or not by a simple process.

Moreover, in the first embodiment, when the determining module 266 determines that off-track has occurred, the writing module 261 writes data to be written to a sector where the off-track has occurred to a substitute sector. In this way, the writing module 261 can easily recognize whether off-track has occurred or not, and the process at the time of the occurrence of off-track can be performed appropriately.

In addition, the substitute sector for the temporary defective sector may be positioned after the position on the target track subsequent to the temporary defective sector as long as the substitute sector is positioned to be subsequent to the temporary defective sector on the target track. In this case, the registering module 262 may register correspondence information in which the position data of a temporary defective sector as a sector where the off-track has occurred and the position data of a substitute sector to which the data to be written to the sector where the off-track has occurred are written are correlated with each other. For example, the registering module 262 may register the correspondence information in the temporary defective sector table 2621. In this case, the cancellation processing module 264 refers to the correspondence information included in the temporary defective sector table 2621, for example, and specifies a substitute sector corresponding to the registered temporary defective sector.

Figure 11:
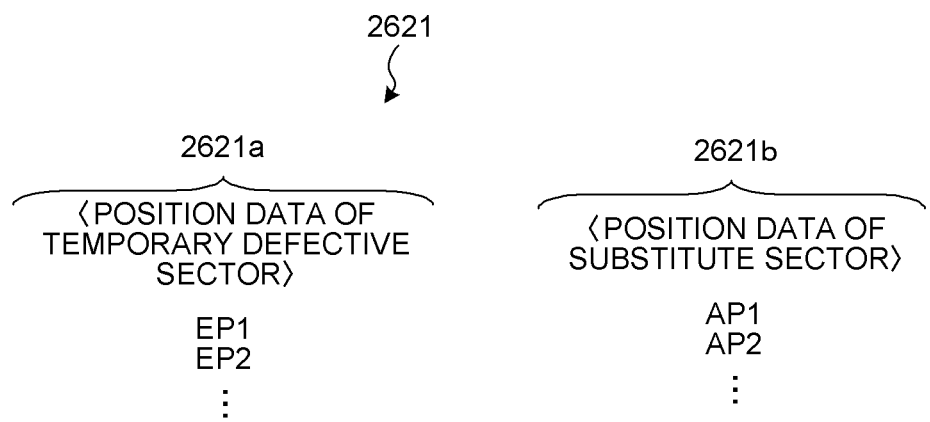
FIG. 11 is a diagram illustrating a data structure of the temporary defective sector table of a modification example of the first embodiment.

For example, the temporary defective sector table 2621 may include a substitute sector position data field 2621b in addition to the temporary defective sector position data field 2621a as illustrated in FIG. 11. The position data AP1, AP2, . . . , and so one of a plurality of substitute sectors are registered in the substitute sector position data field 2621b. By referring to the temporary defective sector table 2621, it is possible to specify the substitute sector position data AP1 corresponding to the temporary defective sector position data EP1, for example, and to specify the substitute sector position data AP2 corresponding to the temporary defective sector position data EP2, for example. That is, even when the substitute sector is positioned after the position on the target track subsequent to the temporary defective sector, it is possible to specify the position of a substitute sector corresponding to the temporary defective sector by referring to the temporary defective sector table 2621.

Second Embodiment

Next, an information recording device 1k according to the second embodiment will be described. In the following description, portions different from the first embodiment will be described mainly.

In the first embodiment, the direction of off-track is not taken into consideration. However, in the second embodiment, the control content is changed depending on the direction of off-track.

Figure 12:
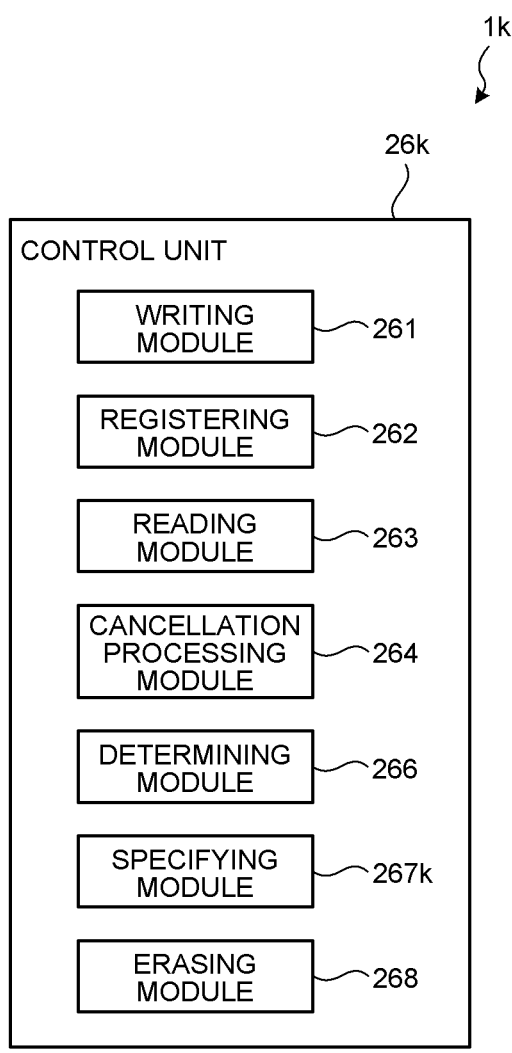
FIG. 12 is a diagram illustrating a configuration of a control module according to a second embodiment.

Specifically, as illustrated in FIG. 12, in the information recording device 1k, a control module 26k further includes a specifying module 267k. The specifying module 267k specifies whether the direction of deviation from a target track of the recording head 22a of the magnetic head 22 is a first direction or a second direction. The first direction is the direction toward a track in which data have already been written. The second direction is the direction toward a track in which data have not yet been written.

Specifically, the specifying module 267k read servo information through the reproducing head 22b when data are written by the writing module 261. The specifying module 267*k* calculates the direction of deviation from a target track of the recording head 22*a* of the magnetic head 22 based on the read servo information. For example, the specifying module 267*k* specifies the direction of deviation to be the second direction based on the information of the servo SB1 illustrated in FIG. 6B. Alternatively, for example, the specifying module 267*k* specifies the direction of deviation to be the first direction based on the information of the servo SB2 illustrated in FIG. 15B.

Figure 15A:
FIGS. 15A to 15D are diagrams illustrating an operation of the information recording device of the second embodiment.
Figure 15B:
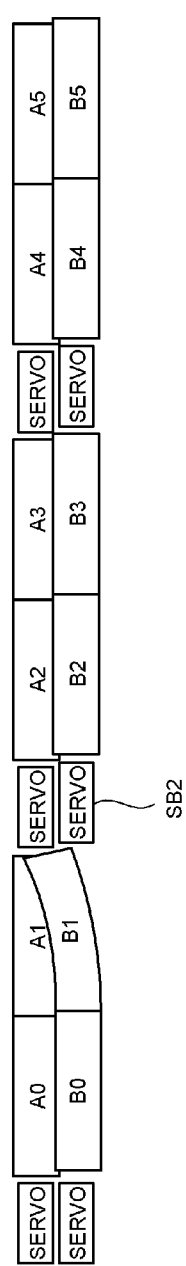

For example, when the direction of deviation is the first direction, as illustrated in FIG. 15B, there is a possibility that the data written to adjacent sectors A0 and A1 adjacent to the temporary defective sectors B0 and B1 in the first direction are deteriorated by being affected by the data of the temporary defective sectors B0 and B1, and the adjacent sectors A0 and A1 secondarily become temporary defective sectors (secondary temporary defective sectors). Thus, when the amount of deviation is not smaller than the first threshold value TH1, and the direction of deviation is the first direction, that is, when off-track occurs in the direction toward a track in which data have already been written, the writing module 261 reads the data written to a sector adjacent in the first direction to the sector (temporary defective sector) where the off-track has occurred from the buffer memory 29. Moreover, the writing module 261 may write the data written to the sector adjacent in the first direction to a second substitute sector positioned after the substitute sector of the temporary defective sector on the target track.

Figure 15C:
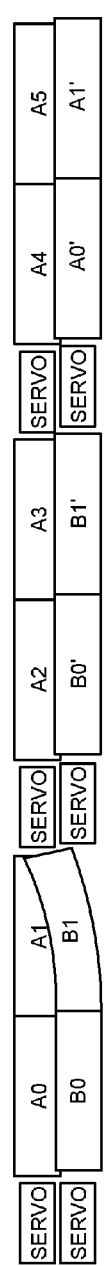
Figure 15D:
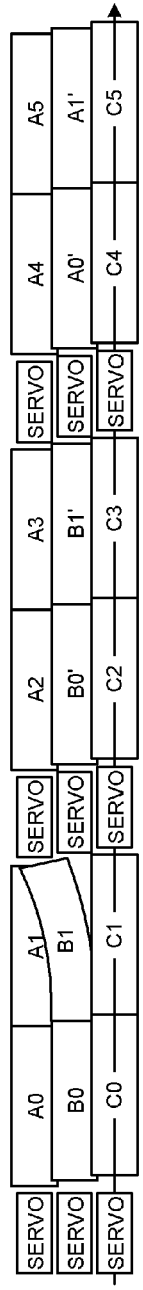

For example, a case will be considered in which after data are sequentially written to sectors A1 to A5 of the track TR1 as illustrated in FIG. 15A, data are sequentially written to sectors B1 to B1 of the track TR2 as illustrated in FIG. 15B, and the occurrence of off-track in the sectors B1 and B1 is detected based on the information of a servo SB2 subsequent to the sector B1. In this case, since off-track has occurred when writing data to the sectors B0 and B1, writing of data to the sectors B0 and B1 is regarded as a writing fault, and the sectors B0 and B1 as temporary defective sectors. Moreover, the adjacent sectors A0 and A1 adjacent to the temporary defective sectors B0 and B1 in the first direction are regarded as secondary temporary defective sectors. Moreover, as illustrated in FIG. 15C, the data to be written to the sectors B0 and B1 are read from the buffer memory 29 using the sectors B2 and B3 subsequent to the sectors B0 and B1 as substitute sectors B0' and B1', and the read data are written to the substitute sectors B0' and B1'. Furthermore, the backup data for the data written to the sectors A0 and A1 are read from the buffer memory 29 using the sectors B4 and B5 subsequent to the substitute sectors B0' and B1' as second substitute sectors A0' and A1', and the read data are written to the second substitute sectors A0' and A1'. After that, as illustrated in FIG. 15D, data are sequentially written to the sectors C0 to C5 of the track TR3. In this case, since only writing of initial data is performed on the temporary defective sector B2 and B3, the number of writing to the temporary defective sectors B2 and B3 can be suppressed to one. Moreover, since only writing of initial data is performed on the secondary temporary defective sectors A0 and A1, the number of writing to the secondary temporary defective sectors A0 and A1 can also be suppressed to one.

Figure 13:
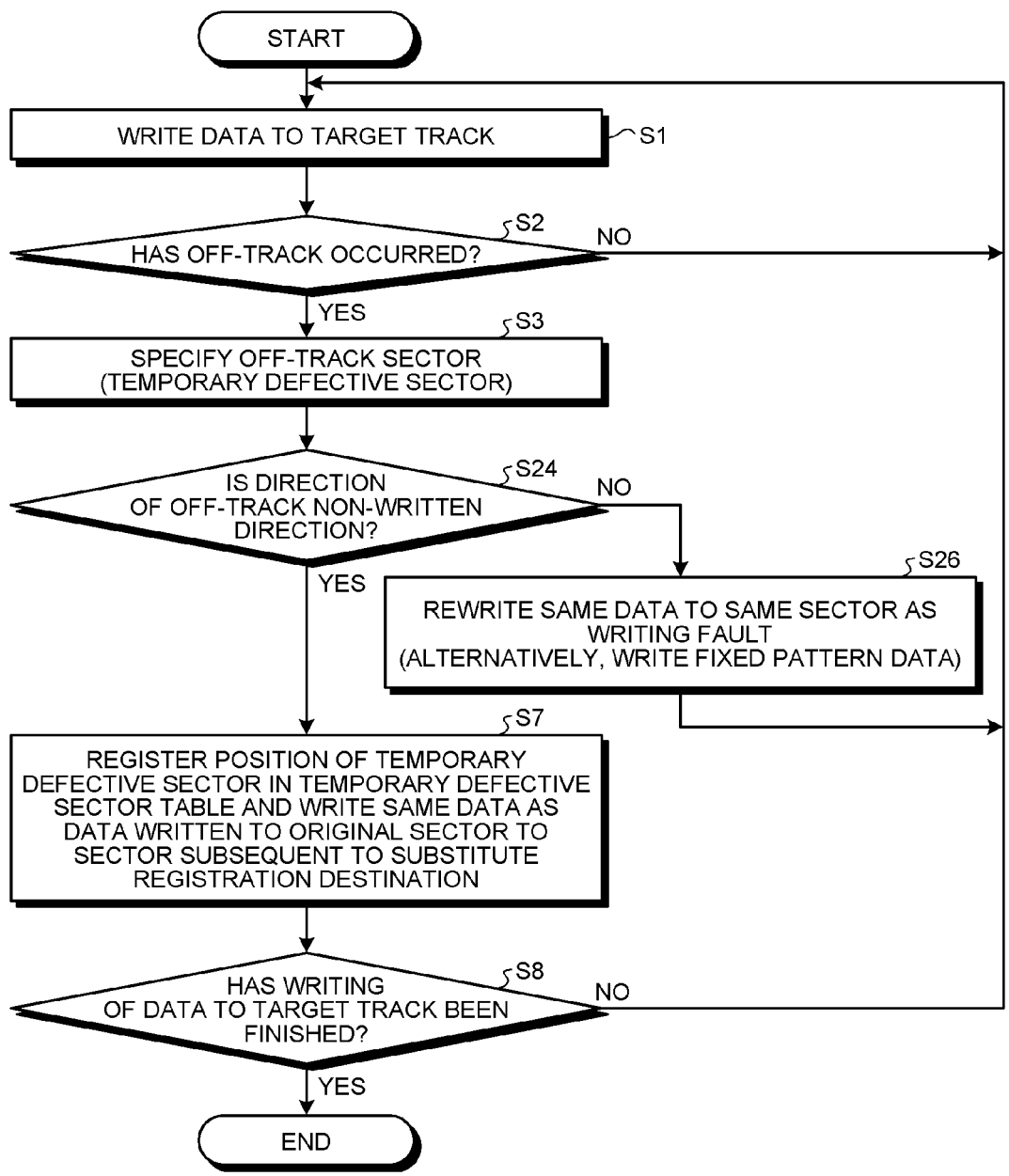
FIG. 13 is a flowchart illustrating an operation of an information recording device of the second embodiment.

Moreover, a writing operation of the information recording device 1*k* is different from the first embodiment from the following respects as illustrated in FIG. 13.

In step S24, the specifying module 267*k* specifies whether the direction of deviation from a target track of the recording head 22*a* of the magnetic head 22 is the first direction or the second direction. The specifying module 267*k* supplies the specifying results to the determining module 266. The determining module 266 determines whether the direction of deviation is the first direction or the second direction based on the specifying results of the specifying module 267*k*. When the direction of deviation is the second direction (non-written direction) (Yes in step S24), the determining module 266 determines that it is not necessary to reaccess the sector where the off-track has occurred and proceeds the process to step S7.

On the other hand, when the direction of deviation is the first direction (written direction) (No in step S24), since the data of the adjacent sector are written to the second substitute sector as described above, it is considered that no problem occurs even when the sector where the off-track has occurred is reaccessed. Therefore, when the direction of deviation is the first direction (written direction) (No in step S24), the determining module 266 determines that the sector where the off-track has occurred is to be reaccessed, and proceeds the process to step S26.

In step S26, the writing module 261 reads data to be written to the sector where the off-track has occurred from the buffer memory 29. Moreover, the writing module 261 rewrites the read data to the sector where the off-track has occurred. The writing module 261 performs retry-write of the data to be written to a sector where the off-track has occurred to the sector where the off-track has occurred.

In addition, in step S26, the writing module 261 may write fixed pattern data to the sector where the off-track has occurred rather than performing retry-write on the sector where the off-track has occurred.

Moreover, in step S26, a sector where retry-write or writing of the fixed pattern has been performed may be registered as an original defective sector so as to be managed separately from a temporary defective sector. In this case, when the determining module 266 determines that it is not necessary to reaccess the sector where the off-track has occurred (Yes in step S24), the registering module 262 registers the position data of a temporary defective sector, for example, in the temporary defective sector table 2621 (see FIG. 10) using the sector where the off-track has occurred as the temporary defective sector in step S7. Moreover, when the determining module 266 determines that it is necessary to reaccess the sector where the off-track has occurred (No in step S24), the registering module 262 registers the position data of an original defective sector, for example, in a temporary defective sector table 2622 (see FIG. 14) using the sector where the off-track has occurred as the original defective sector in step S26.

Figure 14:
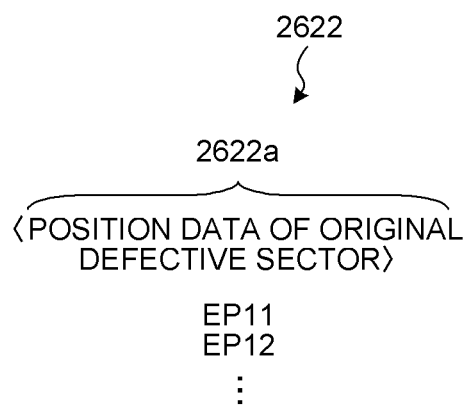
FIG. 14 is a diagram illustrating a data structure of an original defective sector table of the second embodiment.

The temporary defective sector table 2621 includes an original defective sector position data field 2622*a* as illustrated in FIG. 14, for example. The position data EP11, EP12, and so on of a plurality of original defective sectors are recorded in the original defective sector position data field 2622*a*.

Furthermore, in this case, when the sector adjacent to the processing target sector in the track width direction is a temporary defective sector, the cancellation processing module performs inter-track interference component cancellation processing using the data written to a substitute sector corresponding to the temporary defective sector. When the sector adjacent to the processing target sector in the track width direction is an original defective sector, the cancellation processing module performs inter-track interference component cancellation processing using the retry-written data or predetermined fixed pattern data.

As above, in the second embodiment, the specifying module 267*k* specifies whether the direction of deviation from a target track of the recording head 22a of the magnetic head 22 is the first direction or the second direction. The first direction is the direction toward a track in which data have already been written. The second direction is the direction toward a track in which data have not yet been written. In this way, control can be performed appropriately depending on the direction of off-track.

Moreover, in the second embodiment, when the amount of deviation is equal to or greater than the first threshold value TH1, and the direction of deviation is the first direction, the writing module 261 read data written to a sector adjacent in the first direction to the sector where the off-track has occurred from the buffer memory 29 and writes the data written to the sector adjacent in the first direction to a second substitute sector positioned subsequent to the substitute sector on the target track. In this way, the data of a temporary defective sector occurred secondarily can be read from the second substitute sector.

Moreover, in the second embodiment, when the direction of deviation is the second direction (non-written direction) (Yes in step S24), the determining module 266 determines that it is not necessary to reaccess the sector where the off-track has occurred. When the direction of deviation is the first direction (written direction) (No in step S24), the determining module 266 determines that it is necessary to reaccess the sector where the off-track has occurred. In this way, control can be performed appropriately depending on the direction of off-track.

Moreover, in the second embodiment, when the determining module 266 determines that it is not necessary to reaccess the sector where the off-track has occurred, the registering module 262 registers the position data of a temporary defective sector using the sector where the off-track has occurred as the temporary defective sector. When the determining module 266 determines that it is necessary to reaccess the sector where the off-track has occurred, the registering module 262 registers the position data of an original defective sector using the sector where the off-track has occurred as the original defective sector. In this way, temporary defective sectors subject to different writing control can be managed in a different manner.

Third Embodiment

Next, an information recording device 1i according to the third embodiment will be described. In the following description, portions different from the second embodiment illustrated in FIGS. 12 to 15 will be described mainly.

In the second embodiment, although the degree of off-track is not particularly taken into consideration, if the degree of off-track is very large, there is a possibility that processing accuracy decreases when inter-track interference component cancellation processing is performed during reading. Therefore, in the third embodiment, the control content mainly in the writing process is changed depending on the degree of off-track.

Figure 16:
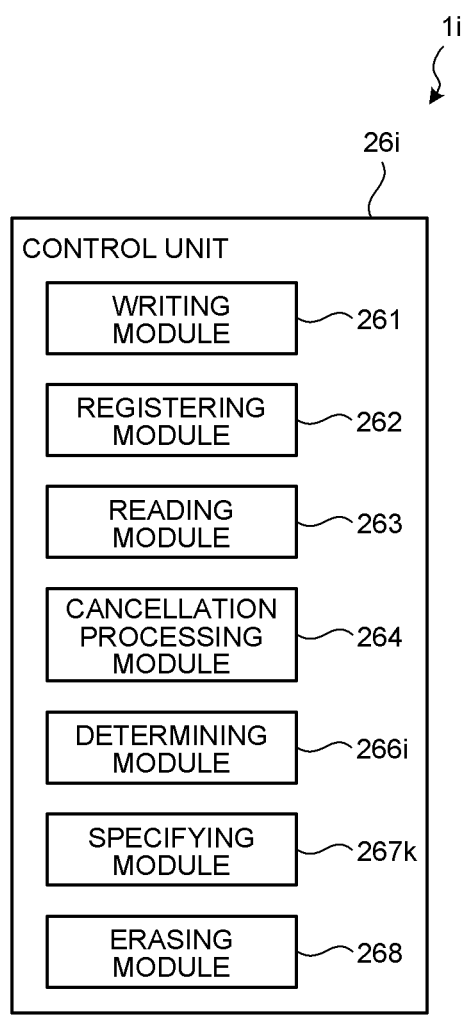
FIG. 16 is a diagram illustrating a configuration of a control module according to a third embodiment.

Specifically, as illustrated in FIG. 16, in a control module 26i of the information recording device 1i, a second threshold value TH2 is set in advance in a determining module 266i in addition to the first threshold value TH1. The second threshold value TH2 is a threshold value serving as the reference of determining whether the degree of off-track is in such an extent that off-track can be solved by a substitute sector, and is larger than the first threshold value TH1.

The determining module 266i compares the amount of deviation from a target track of the magnetic head 22 with the first and second threshold values TH1 and TH2 and determines whether off-track has occurred or not based on the comparison results. That is, when the amount of deviation is equal to or greater than the first threshold value TH1 and is smaller than the second threshold value TH2, the determining module 266i determines that it is not necessary to reaccess the sector where the off-track has occurred by determining that the degree of off-track is in such an extent that off-track can be solved by a substitute sector. When the amount of deviation is equal to or greater than the second threshold value TH2, the determining module 266i determines that it is necessary to reaccess the sector where the off-track has occurred by determining that the degree of off-track exceeds such an extent that off-track can be solved by a substitute sector.

In this case, when the determining module 266i determines that it is not necessary to reaccess the sector where the off-track has occurred, the writing module 261 writes the data to be written to the sector where the off-track has occurred to the substitute sector.

On the other hand, when the determining module 266i determines that it is necessary to reaccess the sector where the off-track has occurred, the writing module 261 rewrites the data to be written to the sector where the off-track has occurred to the sector where the off-track has occurred. That is, the writing module 261 performs retry-write of the data to be written to a sector where the off-track has occurred to the sector where the off-track has occurred.

Alternatively, when the determining module 266i determines that it is necessary to reaccess the sector where the off-track has occurred, the writing module 261 rewrites predetermined fixed pattern data to the sector where the off-track has occurred.

Figure 17:
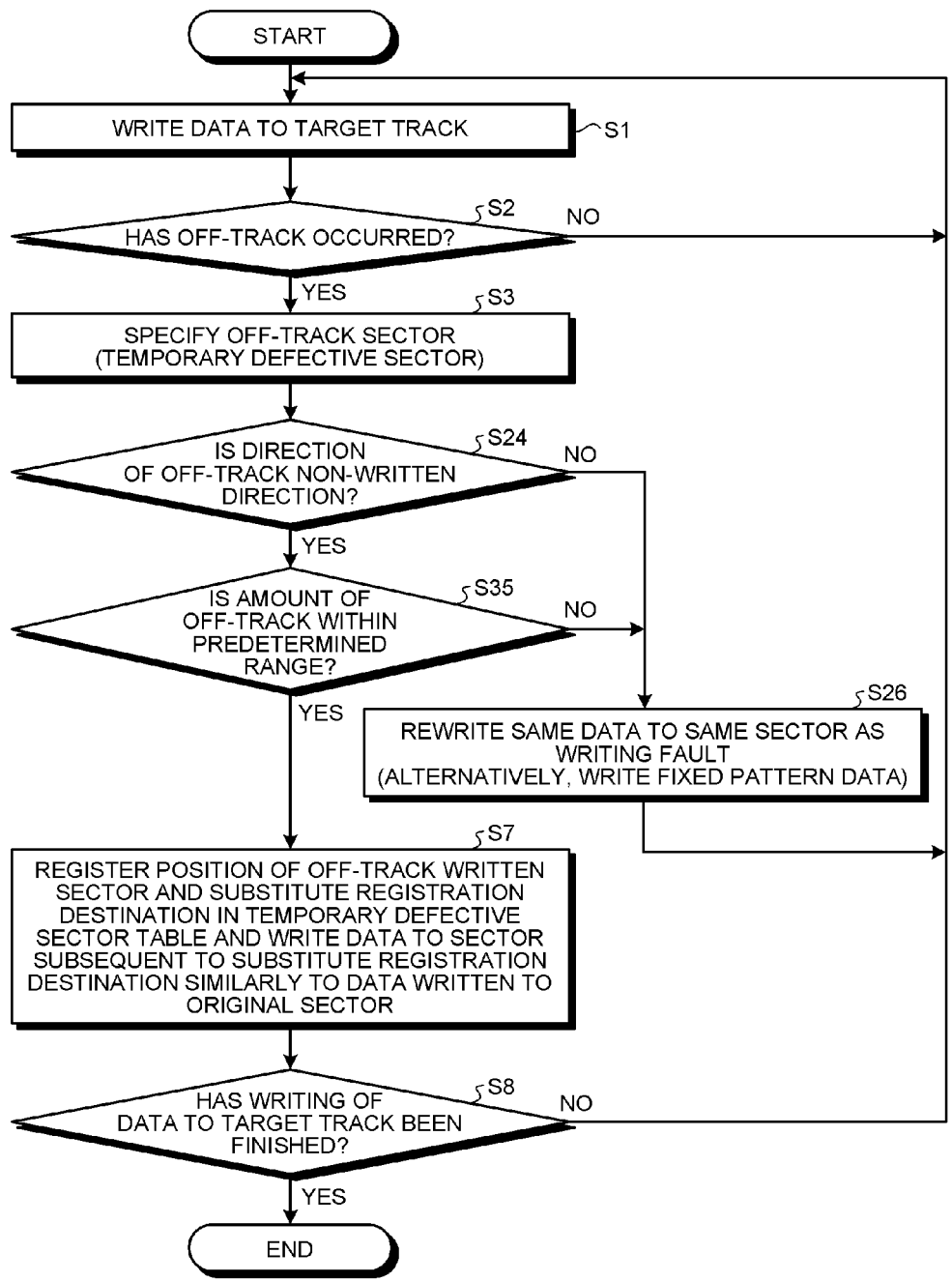
FIG. 17 is a flowchart illustrating an operation of an information recording device of the third embodiment.

Moreover, a writing operation of the information recording device 1i is different from the modification example of the first embodiment from the following respects as illustrated in FIG. 17.

In step S35, the determining module 266i determines whether or not the amount of off-track is within a predetermined range.

Specifically, the determining module 266 compares the amount of deviation calculated in step S2 with the second threshold value TH2 and determines whether or not the amount of off-track is within a predetermined range based on the comparison results.

For example, when the amount of deviation is smaller than the second threshold value TH1, the determining module 266 determines that it is not necessary to reaccess the sector where the off-track has occurred by determining that the degree of off-track is in such an extent that off-track can be solved by the substitute sector, and proceeds the process to step S7.

On the other hand, when the amount of deviation is equal to or greater than the second threshold value TH2, the determining module 266 determines that it is necessary to reaccess the sector where the off-track has occurred by determining that the degree of off-track exceeds such an extent that off-track can be solved by the substitute sector, and proceeds the process to step S26.

Figure 18:
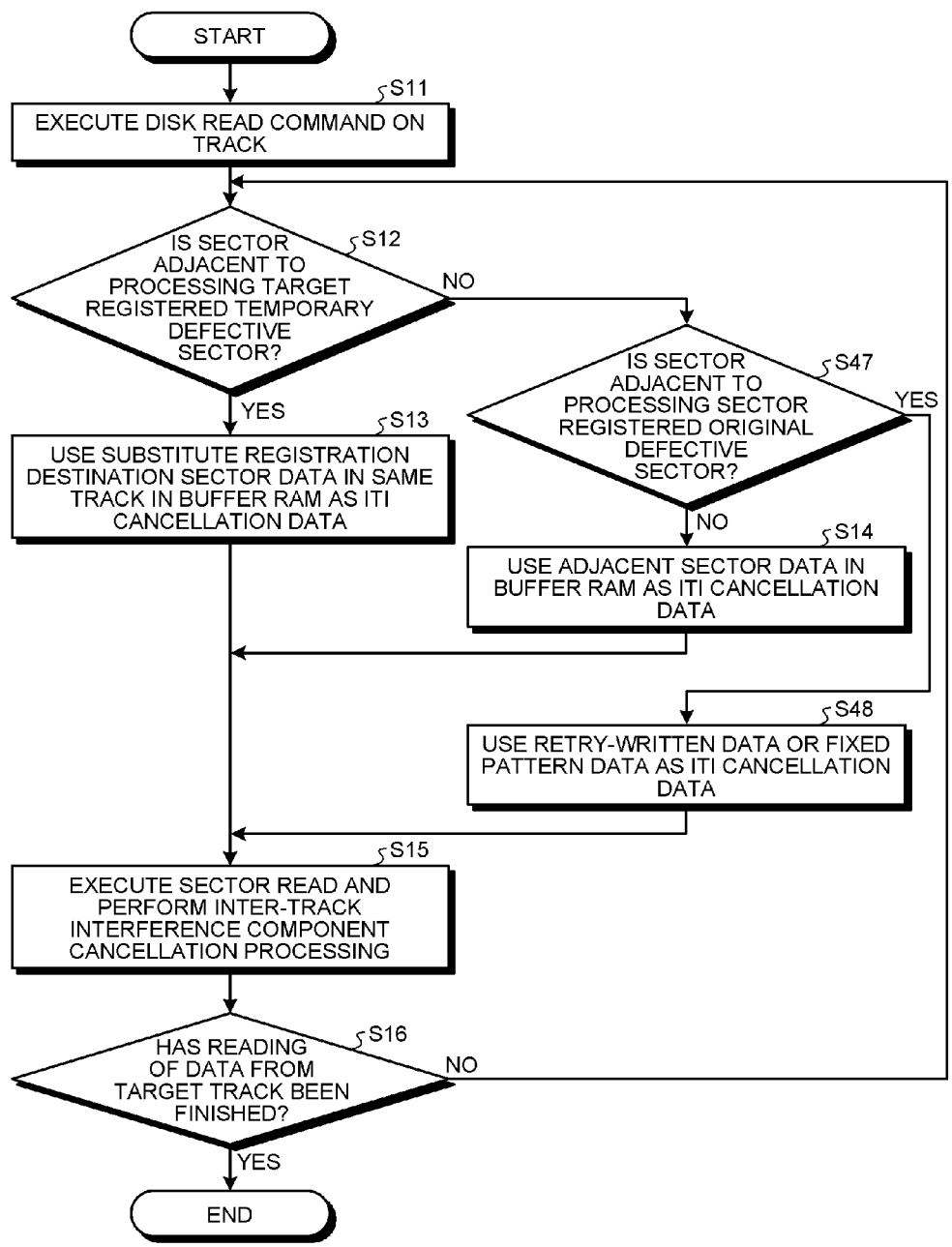
FIG. 18 is a flowchart illustrating an operation of the information recording device of the third embodiment.
Figure 19:
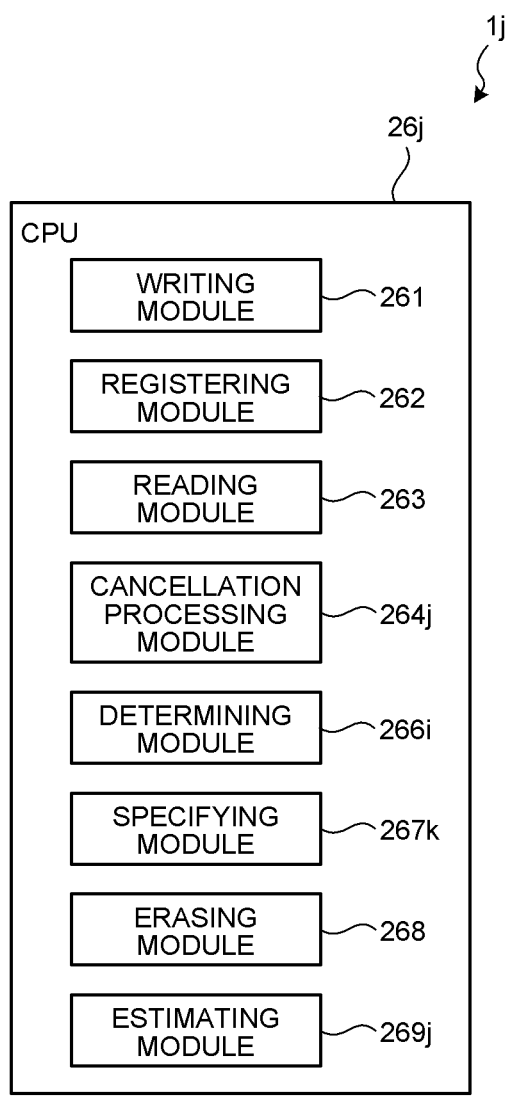
FIG. 19 is a diagram illustrating a configuration of a control module according to a fourth embodiment.

Moreover, a reading operation of the information recording device 1i is different from the first embodiment from the following respects as illustrated in FIG. 18.

In step S47, the cancellation processing module 264 determines whether or not an adjacent sector adjacent to the processing target sector in the track width direction is an original defective sector registered by the registering module 262.

Specifically, the cancellation processing module 264 determines whether the adjacent sector is an original defective sector by referring to the original defective sector table 2622 (see FIG. 14). The cancellation processing module 264 proceeds the process to step S48 when the adjacent sector is an original defective sector (Yes in step S47), and proceeds the process to step S14 when the adjacent sector is not an original defective sector (No in step S47).

In step S48, the cancellation processing module 264 performs preparations so that retry-written data or the fixed pattern data are used for inter-track interference component cancellation processing.

Specifically, the cancellation processing module 264 reads retry-written data from the buffer memory 29. The cancellation processing module 264 sets the read data as data to be used for inter-track interference component cancellation processing. Alternatively, the cancellation processing module 264 sets predetermined fixed pattern data as data to be used for inter-track interference component cancellation processing.

As above, in the third embodiment, when the amount of deviation is equal to or greater than the first threshold value TH1 and is smaller than the second threshold value TH2, the determining module 266i determines that it is not necessary to reaccess the sector where the off-track has occurred by determining that the degree of off-track is in such an extent that off-track can be solved by a substitute sector. When the amount of deviation is equal to or greater than the second threshold value TH2, the determining module 266i determines that it is necessary to reaccess the sector where the off-track has occurred by determining that the degree of off-track exceeds such an extent that off-track can be solved by a substitute sector. In this way, control can be performed appropriately depending on the degree of off-track.

Fourth Embodiment

Next, an information recording device 1j according to the fourth embodiment will be described. In the following description, portions different from the second embodiment will be described mainly.

In the second embodiment, although the degree of off-track is not particularly taken into consideration, if the degree of off-track is very large, there is a possibility that processing accuracy decreases when inter-track interference component cancellation processing is performed during reading. Therefore, in the fourth embodiment, the content of inter-track interference component cancellation processing is changed depending on the degree of off-track.

Specifically, in the information recording device 1j, the registering module 262 registers second correspondence information in which the position data of a temporary defective sector as a sector where the off-track has occurred, the position data of a substitute sector to which the data to be written to the sector where the off-track has occurred are written, and the amount of deviation from the target track of the magnetic head when off-track occurs are correlated with each other. For example, the registering module 262 may register the correspondence information in the temporary defective sector table 2621.

For example, as illustrated in FIG. 20, a temporary defective sector table 2621j may include a deviation amount field 2621cj in addition to the temporary defective sector position data field 2621a and the substitute sector position data field 2621b. A plurality of amounts of deviation OF1, OF2, and so one are recorded in the deviation amount field 2621cj. By referring to the temporary defective sector table 2621j, it is possible to specify the substitute sector position data AP1 and the amount of deviation OF1 corresponding to the temporary defective sector position data EP1, for example, and to specify the substitute sector position data AP2 and the amount of deviation OF2 corresponding to the temporary defective sector position data EP2, for example. That is, by referring to the temporary defective sector table 2621j, it is possible to specify the amount of deviation as well as the position of the substitute sector corresponding to the temporary defective sector.

Moreover, the information recording device 1j further includes an estimating module 269j. The estimating module 269j estimates an interference level of inter-track interference components by referring to the second correspondence information included in the temporary defective sector table 2621j, for example.

For example, as illustrated in FIG. 21A, when the amount of deviation is OF1, the estimating module 269j estimates that the interference level is C1 by determining that the area $S_{h1}$ scanned by the reproducing head 22b when the reproducing head 22b of the magnetic head 22 reads data from the sector C2 is approximately the same as the overlapping area $S_{B2}$ of the adjacent sector B2.

For example, when the amount of deviation is OF1, the estimating module 269j estimates that the interference level is C1 by determining that the area $S_{h2}$ scanned by the reproducing head 22b when the reproducing head 22b of the magnetic head 22 reads data from the sector C3 is approximately the same as the overlapping area $S_{B3}$ of the adjacent sector B3.

For example, as illustrated in FIG. 21B, when the amount of deviation is OF2, the estimating module 269j estimates that the interference level is C1 by determining that the area $S_{h1}$ scanned by the reproducing head 22b when the reproducing head 22b of the magnetic head 22 reads data from the sector C2 is approximately the same as the overlapping area $S_{B2}$ of the adjacent sector B2.

For example, when the amount of deviation is OF2, the estimating module 269j estimates the interference level is C2 (<C1) by determining that the area $S_{h2}$ scanned by the reproducing head 22b when the reproducing head 22b of the magnetic head 22 reads data from the sector C3 is larger than the overlapping area $S_{B31}$ of the adjacent sector B3.

In addition, the cancellation processing module 264j specifies the substitute sector corresponding to the temporary defective sector by referring to the second correspondence information and performs inter-track interference component cancellation processing using the data written to the specified substitute sector and the interference level estimated by the estimating module 269j.

As above, in the fourth embodiment, the registering module 262 registers the second correspondence information in which the position data of a temporary defective sector as a sector where the off-track has occurred, the position data of a substitute sector to which the data to be written to the sector where the off-track has occurred are written, and the amount of deviation from the target track of the magnetic head when off-track occurs are correlated with each other. The estimating module 269j estimates the interference level of inter-track interference components by referring to the registered second correspondence information. The cancellation processing module 264j specifies the substitute sector corresponding to the temporary defective sector by referring to the second correspondence information and performs inter-track interference component cancellation processing using the data written to the specified substitute sector and the interference level estimated by the estimating module 269j. In this way, since the inter-track interference component cancellation processing can be performed in accordance with the degree of off-track, it is possible to easily improve the accuracy of inter-track interference component cancellation processing.

While certain embodiments according to the present invention have been described, these embodiments have been presented by way of example only, and are not intended to limit the scope of the inventions. These new embodiments can be embodied in a variety of other forms, and various omissions, substitutions, and changes can be made without departing from the spirit of the inventions. Moreover, the embodiments and modifications thereof fall within the scope and spirit of the inventions and fall within the scope of the inventions described in the claims and their equivalents.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information recording device that records information on a magnetic disk using a magnetic head, comprising:
    a writing module configured to write data to a target track so that the target track partially overlaps a track adjacent to the target track of the magnetic disk, in which when off-track wherein the magnetic head deviates from the target track occurs, data to be written to a sector where the off-track has occurred are written to a substitute sector positioned after the sector where the off-track has occurred;
    a registering module configured to register position data of a temporary defective sector using the sector where the off-track has occurred as the temporary defective sector;
    a reading module configured to read data from the target track; and
    a cancellation processing module configured to perform inter-track interference component cancellation processing with respect to the data read by the reading module using data written to a track adjacent to the target track, in which when a sector adjacent to a processing target sector in a track width direction is a temporary defective sector registered in the registering module, inter-track interference component cancellation processing is performed using data written to a substitute sector corresponding to the registered temporary defective sector.

2. The information recording device according to claim 1, wherein the registering module is configured to register correspondence information in which position data of the temporary defective sector and position data of the substitute sector are correlated with each other, and
    wherein the cancellation processing module is configured to specify the substitute sector corresponding to the registered temporary defective sector by referring to the correspondence information.

3. The information recording device according to claim 1, wherein the writing module is configured to write data to be written to the sector where the off-track has occurred using a sector on the target track subsequent to the sector where the off-track has occurred as the substitute sector when the off-track has occurred during writing, and
    wherein the cancellation processing module is configured to specify a sector subsequent to the registered temporary defective sector on the adjacent track as a substitute sector corresponding to the temporary defective sector.

4. The information recording device according to claim 1, further comprising
    a determining module configured to compare an amount of deviation from the target track of the magnetic head with a first threshold value and a second threshold value larger than the first threshold value, to determine that it is not necessary to reaccess the sector where the off-track has occurred when the amount of deviation is not smaller than the first threshold value and is smaller than the second threshold value, and to determine that it is necessary to reaccess the sector where the off-track has occurred when the amount of deviation is not smaller than the second threshold value,
    wherein the writing module is configured to write data to be written to the sector where the off-track has occurred to the substitute sector when it is determined that it is not necessary to reaccess the sector where the off-track has occurred and to rewrite the data to be written to the sector where the off-track has occurred to the sector where the off-track has occurred and alternatively, to write predetermined fixed pattern data to the sector where the off-track has occurred, when it is determined that it is necessary to reaccess the sector where the off-track has occurred.

5. The information recording device according to claim 1, further comprising:
    a determining module configured to compare an amount of deviation from the target track of the magnetic head with a first threshold value and a second threshold value larger than the first threshold value, to specify whether the direction of deviation from the target track of the magnetic head is a first direction toward a track in which data have already been written or a second direction toward a track in which data have not yet been written, to determine that it is not necessary to reaccess the sector where the off-track has occurred when the amount of deviation is not smaller than the first threshold value and is smaller than the second threshold value, and the direction of deviation is the second direction, and to determine that it is necessary to reaccess the sector where the off-track has occurred when the amount of deviation is not smaller than the second threshold value, or when the direction of deviation is the first direction,
    wherein the writing module is configured to write data to be written to the sector where the off-track has occurred to the substitute sector when it is determined that it is not necessary to reaccess the sector where the off-track has occurred and to rewrite the data to be written to the sector where the off-track has occurred to the sector where the off-track has occurred, and alternatively, to write predetermined fixed pattern data to the sector where the off-track has occurred, when it is determined that it is necessary to reaccess the sector where the off-track has occurred.

6. The information recording device according to claim 1, further comprising
    a storage module configured to store data of tracks in which data have already been written by the writing module,
    wherein when an amount of deviation from the target track of the magnetic head is not smaller than a first threshold value, and the direction of deviation from the target track of the magnetic head is a first direction toward a track in which data have already been written, the writing module is configured to read data written to a sector adjacent in the first direction to the sector where the off-track has occurred from the storage module and to write the data written to the sector adjacent in the first direction to a second substitute sector positioned after the substitute sector on the target track.

7. The information recording device according to claim 1, wherein the registering module is configured to register position data of a temporary defective sector using the sector where the off-track has occurred as the temporary defective sector when it is determined that it is not necessary to reaccess the sector where the off-track has occurred and to register position data of an original defective sector using the sector where the off-track has occurred as the original defective sector when it is determined that it is necessary to reaccess the sector where the off-track has occurred.

8. The information recording device according to claim 7, wherein the cancellation processing module is configured to perform inter-track interference component cancellation processing using data written to a substitute sector corresponding to the registered temporary defective sector when a sector adjacent to a processing target sector in the track width direction is the registered temporary defective sector and to perform inter-track interference component cancellation processing using predetermined fixed pattern data when the sector adjacent to the processing target sector in the track width direction is the registered original defective sector.

9. The information recording device according to claim 1, wherein the registering module is configured to register second correspondence information in which a position data of a temporary defective sector as the sector where the off-track has occurred, a position data of a substitute sector in which data to be written to the sector where the off-track has occurred are written, and an amount of deviation from the target track of the magnetic head when the off-track has occurred are correlated with each other, and
wherein the information recording device further comprises an estimating module configured to estimate an interference level of inter-track interference components by referring to the second correspondence information, and
wherein the cancellation processing module is configured to specify a substitute sector corresponding to the registered temporary defective sector by referring to the second correspondence information and to perform inter-track interference component cancellation processing using data written to the specified substitute sector and the estimated interference level.

10. An information recording method of recording information on a magnetic disk with a magnetic head, comprising:
writing data to a target track so that the target track partially overlaps a track adjacent to the target track of the magnetic disk, in which when off-track wherein the magnetic head deviates from the target track occurs, data to be written to a sector where the off-track has occurred are written to a substitute sector positioned after the sector where the off-track has occurred;
registering position data of a temporary defective sector using the sector where the off-track has occurred as the temporary defective sector;
reading data from the target track; and
performing inter-track interference component cancellation processing with respect to the read data using data written to a track adjacent to the target track, in which when a sector adjacent to a processing target sector in a track width direction is the registered temporary defective sector, inter-track interference component cancellation processing is performed using data written to a substitute sector corresponding to the registered temporary defective sector.

11. The information recording method according to claim 10,
wherein the registering comprises registering correspondence information in which position data of the temporary defective sector and position data of the substitute sector are correlated with each other, and
wherein the performing the inter-track interference component cancellation comprises specifying the substitute sector corresponding to the registered temporary defective sector by referring to the correspondence information.

12. The information recording method according to claim 10,
wherein the writing comprises writing data to be written to the sector where the off-track has occurred using a sector on the target track subsequent to the sector where the off-track has occurred as the substitute sector when the off-track has occurred during writing, and
wherein the performing the inter-track interference component cancellation comprises specifying a sector subsequent to the registered temporary defective sector on the adjacent track as a substitute sector corresponding to the temporary defective sector.

13. The information recording method according to claim 10, further comprising
determining by comparing an amount of deviation from the target track of the magnetic head with a first threshold value and a second threshold value larger than the first threshold value, determining that it is not necessary to reaccess the sector where the off-track has occurred when the amount of deviation is not smaller than the first threshold value and is smaller than the second threshold value, and determining that it is necessary to reaccess the sector where the off-track has occurred when the amount of deviation is not smaller than the second threshold value,
wherein the writing comprises writing data to be written to the sector where the off-track has occurred to the substitute sector when it is determined that it is not necessary to reaccess the sector where the off-track has occurred, rewriting the data to be written to the sector where the off-track has occurred to the sector where the off-track has occurred and alternatively, and writing predetermined fixed pattern data to the sector where the off-track has occurred, when it is determined that it is necessary to reaccess the sector where the off-track has occurred.

14. The information recording method according to claim 10, further comprising:
determining by comparing an amount of deviation from the target track of the magnetic head with a first threshold value and a second threshold value larger than the first threshold value, specifying whether the direction of deviation from the target track of the magnetic head is a first direction toward a track in which data have already been written or a second direction toward a track in which data have not yet been written, determining that it is not necessary to reaccess the sector where the off-track has occurred when the amount of deviation is not smaller than the first threshold value and is smaller than the second threshold value, and the direction of deviation is the second direction, and determining that it is necessary to reaccess the sector where the off-track has occurred when the amount of deviation is not smaller than the second threshold value, or when the direction of deviation is the first direction, wherein the writing comprises writing data to be written to the sector where the off-track has occurred to the substitute sector when it is determined that it is not necessary to reaccess the sector where the off-track has occurred, rewriting the data to be written to the sector where the off-track has occurred to the sector where the off-track has occurred, and alternatively, writing predetermined fixed pattern data to the sector where the off-track has occurred, when it is determined that it is necessary to reaccess the sector where the off-track has occurred.

15. The information recording method according to claim 10, further comprising storing data of tracks in which data have already been written in the writing, wherein when an amount of deviation from the target track of the magnetic head is not smaller than a first threshold value, and the direction of deviation from the target track of the magnetic head is a first direction toward a track in which data have already been written, the writing comprises reading data written to a sector adjacent in the first direction to the sector where the off-track has occurred from the stored data, and writing the data written to the sector adjacent in the first direction to a second substitute sector positioned after the substitute sector on the target track.

16. The information recording method according to claim 10, wherein the registering comprises registering position data of a temporary defective sector using the sector where the off-track has occurred as the temporary defective sector when it is determined that it is not necessary to reaccess the sector where the off-track has occurred and registering position data of an original defective sector using the sector where the off-track has occurred as the original defective sector when it is determined that it is necessary to reaccess the sector where the off-track has occurred.

17. The information recording method according to claim 16, wherein the performing inter-track interference component cancellation comprises performing inter-track interference component cancellation processing using data written to a substitute sector corresponding to the registered temporary defective sector when a sector adjacent to a processing target sector in the track width direction is the registered temporary defective sector and performing inter-track interference component cancellation processing using predetermined fixed pattern data when the sector adjacent to the processing target sector in the track width direction is the registered original defective sector.

18. The information recording method according to claim 10, wherein the registering comprises registering second correspondence information in which a position data of a temporary defective sector as the sector where the off-track has occurred, a position data of a substitute sector in which data to be written to the sector where the off-track has occurred are written, and an amount of deviation from the target track of the magnetic head when the off-track has occurred are correlated with each other, and wherein the method further comprises estimating an interference level of inter-track interference components by referring to the second correspondence information, and wherein the performing the inter-track interference component cancellation comprises specifying a substitute sector corresponding to the registered temporary defective sector by referring to the second correspondence information and performing inter-track interference component cancellation processing using data written to the specified substitute sector and the estimated interference level.

* * * * *